Figure 1:
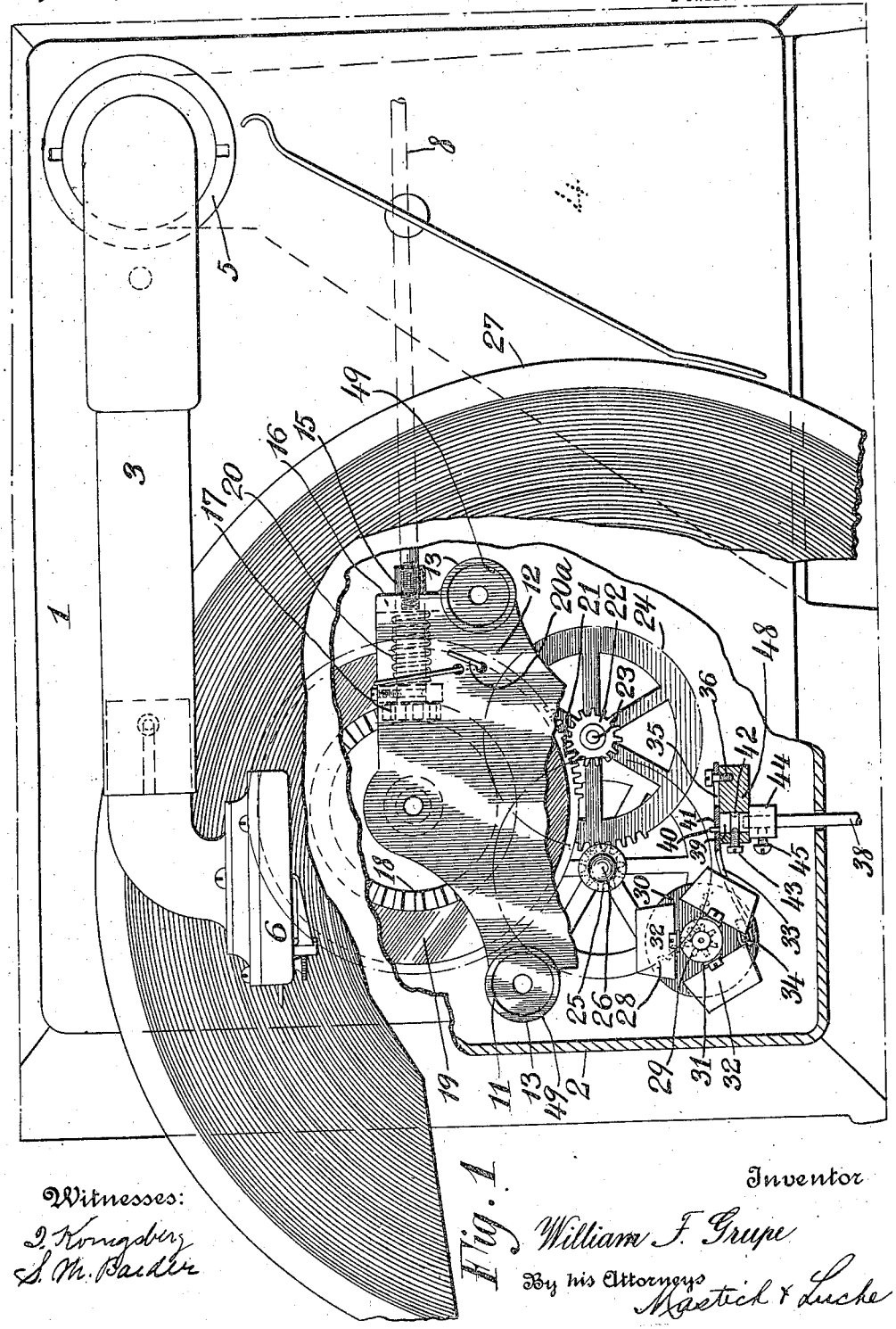

W. F. GRUPE.
MOTOR MECHANISM AND SPEED REGULATING MEANS THEREFOR.
APPLICATION FILED FEB. 20, 1915.

1,243,285.

Patented Oct. 16, 1917.

Witnesses:
Inventor
William F. Grupe
By his Attorneys

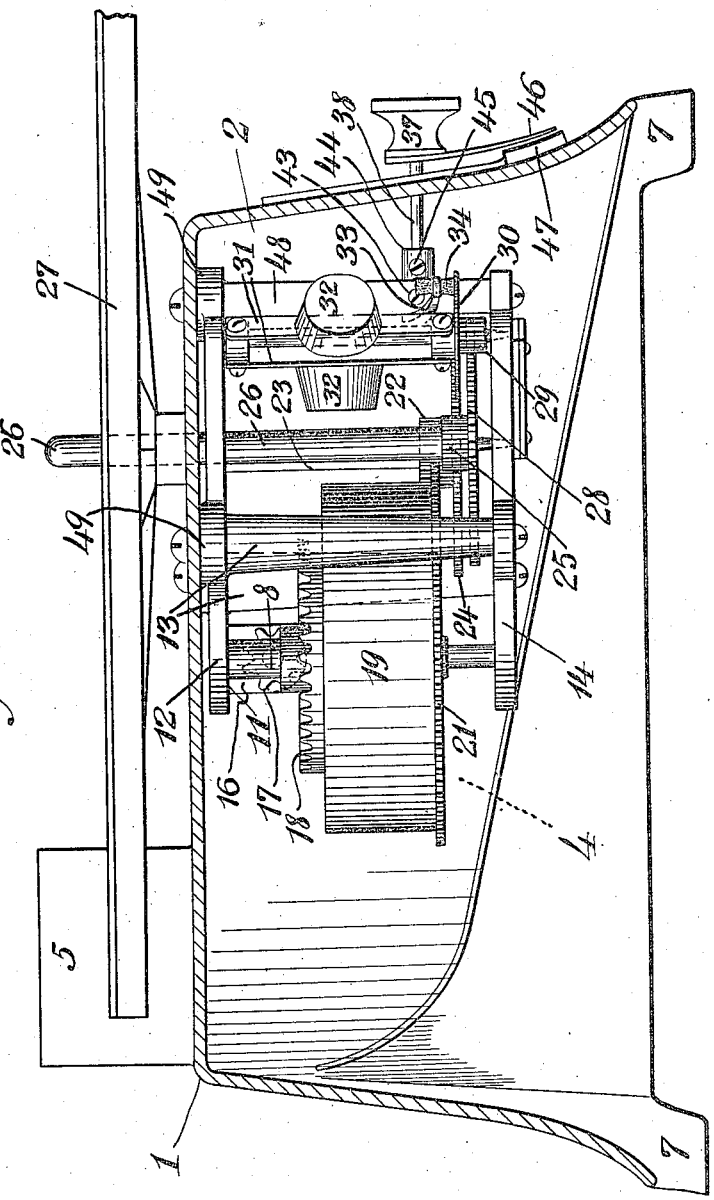

UNITED STATES PATENT OFFICE.

WILLIAM F. GRUPE, OF JERSEY CITY, NEW JERSEY, ASSIGNOR, BY MESNE ASSIGNMENTS, TO VAN-O-PHONE COMPANY, OF NEW YORK, N. Y., A CORPORATION OF NEW YORK.

MOTOR MECHANISM AND SPEED-REGULATING MEANS THEREFOR.

1,243,285. Specification of Letters Patent. Patented Oct. 16, 1917.

Application filed February 20, 1915. Serial No. 9,613.

*To all whom it may concern:*

Be it known that I, WILLIAM F. GRUPE, a citizen of the United States, residing at Jersey City, county of Hudson, State of New Jersey, have invented certain new and useful Improvements in Motor Mechanisms and Speed-Regulating Means Therefor, described more particularly herein and illustrated in the accompanying drawings, in which—

Figure 1 is a plan view of a phonograph comprising a motor mechanism and speed regulating means therefor illustrating one form of my invention, parts of the casing and frame of the motor mechanism being broken away for the sake of clearness; and Fig. 2 is a side sectional elevation of the same.

Referring to the drawings, the casing 1 of the phonograph comprises the sub-casing 2 and the "horn" 4, the latter forming the terminal portion of the sound tube 3. The sound tube 3 is movable relatively to the casing 1 and is secured thereto by means of the collar 5. The second-box 6 is suitably attached to the movable sound tube 3. The casing 1 is provided with feet 7 adapted to rest on a table or the like.

The sub-casing is disposed on one side of the casing 1 and incloses the motor mechanism. The winding crank of the motor mechanism comprises a suitable handle (not shown) disposed exteriorly of the side of the "horn" 4, the shaft 8 of the winding crank passing through an opening in the outer wall of the "horn" 4 and through an opening in the top wall of sub-casing 2. The motor mechanism *per se* is carried by the frame 11 secured to the top wall of sub-casing 2 as by screws.

The frame 11 comprises the upper plate 12, the side bars 13 and the lower plate 14. The side bars 13 are preferably cast integrally with either plate 12 or plate 14; as shown, the side bars 13 are cast integrally with the upper plate 12 and are of an elongated cone-shape to facilitate withdrawal of the casting from the mold. Such construction effects an improved rigidity of the frame parts and secures the reduction of the number of the frame parts and the amount of material of same to the minimum; in addition, the labor of assembling the frame and the parts of the motor mechanism thereon is materially decreased.

As shown in Fig. 1, the winding shaft 8 enters through collar 15, fixed to the depending lug 16, preferably cast integrally with the upper plate 12. The spur gear 17, having teeth of preferably rounded ends, is fixed to the end of winding shaft 8 and meshes with a similarly cut gear 18, in fixed relation to the barrel 19 of the motor spring. Adjacent the inner end of the winding shaft 8 is provided the coiled spring 20 having one end 20ᵃ fixed to the plate 12 and its body portion wound a sufficient number of times about the shaft 8, the other end being loose; the winding of spring 8 is in such direction that the spring 20 is loosened when the shaft 8 is turned in the direction of winding the motor spring, but upon movement of the shaft 8 in the opposite direction the coiled spring 20 by frictional engagement with shaft 8 is automatically tightened and precludes further turning of shaft 8 in such direction. The driving gear 21, fixed to the driving end of the motor spring, meshes with pinion 22, fixed on shaft 23 to which is also fixed the gear 24, meshing in turn with pinion 25 fixed on driving shaft 26, to which the turntable 27 is suitably secured.

The speed regulating means comprises the gear 28 fixed to driving shaft 26 and meshing with pinion 29 carried by the centrifugal governor comprising the disk 30, springs 31 and weights 32. The arm 33 carries the pad 34 at its free end, said pad 34 coöperating with the disk 30 to determine the desired speed. The arm 33 is pivoted at another portion, such as by means of the slot 35 and screw 36. The position of the pad 34 relative to the disk 30 is controlled by suitable regulating means manipulated by the head nut 37 (Fig. 2). In the specific form illustrated the head nut 37 is fixed to the stud 38 to which is secured the circular end nut 39. The pin 40 is positioned eccentrically on the outer face of end nut 39 and projects through the circular opening 41 in the arm 33. The end nut 39 is provided with the peripheral groove 42 into which extends the guide screw 43. The collar 44 fixed by set screw 45 to the stud 38 assists in precluding displacement of the end nut 39 longitudinally of the stud 38. The index 46 and speed indicating scale 47 (Fig. 2) are provided on the face of the sub-casing 2 to indicate the speed of the rotating table 27.

Viewing the relative positions of these parts as indicated in Fig. 1, the rotation of the head nut 37 in the counter-clockwise direction will cause the eccentric pin 40 to descend and therewith move the pad 34 downwardly until the disk 30 under control of the springs 31 and weights 32 is braked by the pad 34. Similarly, upon turning the head nut 37 in the clockwise direction, the eccentric pin 40 will be moved upwardly and thereby cause the pad 34 to ascend and permit the disk 30 to move upwardly under the centrifugal action of the springs 31 and weights 32. It will be noted that the slot 35 which provides for the relatively longitudinal movement of the arm 33 may be positioned at any desired portion of the arm 33. The fulcrum screw 36 and the guide screw 43 are shown tapped into the post 48 formed preferably integrally with a plate of the motor frame 11. The heads of the side bars 13 are preferably enlarged, as at 49 to provide the desirable spacing between the upper frame plate 12 and the top wall of the sub-casing 2. Preferably the taps for the positioning screws 12 are disposed within the relatively thickened ends of said side bars 13, whereby longer tap holes or thicker positioning screws, or both, are made available for securing a firmer attachment between the frame of the motor mechanism and the upper wall of the casing. If desired, rubber or other resilient cushions may be interposed between the spacing lugs and the top wall of the sub-casing 2.

It will be noted that the parts of the speed regulating means are supported entirely by the frame 11 of the motor mechanism. By such provisional means when the motor mechanism and speed regulating means have been tested and adjusted, preparatory to final assembling, the desired adjustment will be insured after the motor mechanism and speed regulating means have been assembled within the casing of the phonograph.

Whereas I have illustrated my invention by reference to specific forms thereof, it will be understood that many changes and modifications may be made without departing from my invention.

What I claim and desire to secure by Letters Patent is:—

1. The combination with a casing for a phonograph or the like, of a frame for the motor mechanism comprising an upper plate and side bars cast integrally therewith, the connecting portion of said side bars adjacent said plate being enlarged and having tap holes therein, and connecting means passing through said casing into said tap holes.

2. The combination with a casing of a phonograph, of a frame for the motor mechanism comprising an upper plate, side bars cast integrally with said upper plate, said side bars being relatively thicker at the portion thereof adjacent said upper plate and having tap holes therein and spacing lugs disposed at the tops of said side bars and extending above said upper plate, and connecting means passing through said casing into said tap holes.

3. A frame for a motor mechanism comprising in combination an upper plate and side bars cast integrally therewith, the portion of said frame adjacent one of said side bars being enlarged, said enlarged portion being provided with a recess, and connecting means positioned in said recess adapted to suspend said frame from a suitable support.

4. A frame for a motor mechanism comprising in combination an upper plate and side bars cast integrally therewith, the portions of said frame adjacent said side bars respectively being enlarged, said enlarged portions being respectively provided with a recess, and connecting means positioned in said recesses respectively adapted to suspend said frame from a suitable support.

5. A frame for a motor mechanism comprising in combination an upper plate and side bars cast integrally therewith, the portions of said frame adjacent said side bars respectively being enlarged, said enlarged portions being respectively provided with a recess, and connecting means positioned in said recesses respectively adapted to suspend said frame from a suitable support.

6. A frame for a motor mechanism comprising in combination an upper plate and side bars cast integrally therewith, the portions of said frame adjacent said side bars respectively being enlarged, said enlarged portions serving as spacing means and respectively provided with a recess, and connecting means positioned in said recesses respectively adapted to suspend said frame from a suitable support.

7. A frame for a motor mechanism comprising in combination an upper plate and tapered side bars cast integrally therewith, the portions of said frame adjacent said side bars respectively being enlarged, said enlarged portions serving as spacing means and respectively provided with a recess, and connecting means positioned in said recesses and adapted to suspend said frame from a suitable support.

8. A frame for a motor mechanism comprising in combination an upper plate and side bars cast integrally therewith, said side bars being tapered inwardly in the direction away from said upper plate, the portions of said frame adjacent said side bars being respectively enlarged, said enlarged portions being respectively provided with a recess and connecting means positioned in said recesses and adapted to suspend said frame from a suitable support.

9. A frame for a motor mechanism comprising in combination an upper plate and side bars cast integrally therewith, the portion of said frame adjacent said side bars being enlarged, said side bars being tapered inwardly in the direction away from said upper plate, said enlarged portions extending above the upper face of said upper plate to serve as spacing means and respectively provided with a recess, and connecting means positioned in said recesses and adapted to suspend said frame from a suitable support.

10. The combination with motor mechanism, of a speed governor comprising a disk, a centrifugal device driven by said motor mechanism and controlling said disk, an arm having a slot extending longitudinally thereof, a positioning device passing through said slot, a friction pad carried by said arm and adapted to engage a face of said disk, an eccentric element passing through an opening in said arm, and means for rotating said eccentric element.

11. The combination with motor mechanism, of a disk, a centrifugal device driven by said motor mechanism and controlling said disk, an arm having a slot extending longitudinally thereof, a positioning element passing through said slot, a friction pad carried by said arm and adapted to engage a face of said disk, an eccentric element passing through an opening in said arm, said opening being positioned intermediate said friction pad and said slot, and means for rotating said eccentric element.

12. A frame for a motor mechanism, comprising in combination an upper plate and side bars cast integrally therewith, speed governing means comprising a regulating element carried by one of said side bars, said upper plate having enlarged portions adjacent certain of said side bars, said enlarged portions being provided with recesses and connecting means positioned in said recesses adapted to suspend said frame from a suitable support.

13. A frame for a motor mechanism comprising in combination an upper plate and side bars cast integrally therewith, speed governing means comprising a shaft, means for mounting said shaft on two of said side bars, said upper plate having enlarged portions adjacent certain of said side bars, said enlarged portions being provided with recesses and connecting means positioned in said recesses adapted to suspend said frame from a suitable support.

In testimony whereof I have signed this specification in the presence of two subscribing witnesses.

WILLIAM F. GRUPE.

Witnesses:
K. G. LE ARD,
S. M. BAEDER.